United States Patent

Deklerk

[15] 3,655,429

[45] Apr. 11, 1972

[54] METHOD OF FORMING THIN INSULATING FILMS PARTICULARLY FOR PIEZOELECTRIC TRANSDUCERS

[72] Inventor: John Deklerk, Pittsburgh, Pa.

[73] Assignee: Westinghouse Electric Corporation, Pittsburgh, Pa.

[22] Filed: Apr. 16, 1969

[21] Appl. No.: 816,486

Related U.S. Application Data

[63] Continuation-in-part of Ser. No. 505,714, Oct. 29, 1965, abandoned.

[52] U.S. Cl. ....................117/106, 117/201, 118/49.1, 118/49.5, 310/8

[51] Int. Cl. ....................B44d 1/18

[58] Field of Search ....................117/106, 107, 201, 215; 118/49, 50, 49.1, 49.2, 50.1

[56] References Cited

UNITED STATES PATENTS

| | | | |
|---|---|---|---|
| 2,793,609 | 5/1957 | Shen et al. | 118/49 |
| 3,091,707 | 5/1963 | Hutson | 310/8 |
| 3,294,660 | 12/1966 | Kingery et al. | 117/106 X |
| 3,373,050 | 3/1968 | Paul et al. | 117/106 |

*Primary Examiner*—Alfred L. Leavitt
*Assistant Examiner*—C. K. Weiffenbach
*Attorney*—F. Shapoe, C. L. Menzemer and G. H. Telfer

[57] ABSTRACT

A film of an insulating compound is formed by evaporating constituent elements from sources screened by a baffle from the substrate while maintaining the substrate at a temperature at which individual elements will not deposit. II–VI, III–V and other compounds are so formed including compounds such as oxides. The film is stoichiometric and highly oriented when formed on a suitable substrate. Metal oxides, including those of zinc, silicon, magnesium, beryllium, titanium, zirconium and binary oxides such as lithium-gallium oxide, are formed with a low substrate temperature (at least −75° C.). Piezoelectric transducers, as well as other devices, may be so formed in highly oriented films of which zinc oxide offers the highest known electromechanical coupling coefficient.

6 Claims, 4 Drawing Figures

INVENTOR
John de Klerk
BY [signature]
ATTORNEY

METHOD OF FORMING THIN INSULATING FILMS PARTICULARLY FOR PIEZOELECTRIC TRANSDUCERS

RELATED APPLICATION

This application is a continuation-in-part of application Ser. No. 505,714, filed Oct. 29, 1965, now abandoned, of which application Ser. No. 820,702, filed Apr. 25, 1969, is a continuation.

ACKNOWLEDGEMENT OF GOVERNMENT CONTRACTS

The invention herein described was made in the course of or under contracts with the Department of the Air Force and the Department of the Navy.

BACKGROUND OF THE INVENTION

This application relates generally to methods for the formation of thin films of insulating materials particularly for use in piezoelectric transducers and photoconductive devices.

It is of interest to develop means for the production of high frequency acoustic waves in dielectric materials. Previously hypersonic waves of frequency in the range from $10^8$ to $10^{10}$ cycles per second have been generated in dielectric materials either by direct surface excitation of quartz, using conventional quartz transducers at high harmonics, or by using magnetostrictive films.

The technique of direct surface excitation limits investigations to piezoelectric materials that must have certain specific crystallographic orientations.

Generation by high harmonic quartz transducers is relatively inefficient and, furthermore, requires the use acoustic bonds in mounting the transducer that presents additional problems.

The magnetostrictive film technique requires the use of a magnetic field and is thus restricted to purposes not affected by the presence of a magnetic field.

It would be desirable to avoid the problems discussed with the above-mentioned techniques by thin films of piezoelectric material on a suitable substrate. It will be recognized that very high frequency generation requires very thin films because the wavelength is short and half-wavelength films are necessary. It seems that the nature and perfection of the requisite films is very critical for success and it has been difficult to get reproducible results.

For example, cadmium sulfide is a known material known to exhibit piezoelectric properties. Techniques have also been previously disclosed for forming films of cadmium sulfide by evaporation of the compound from a powdered source. However, it is found that this technique often results in poorly oriented and non-stoichiometric semiconducting films. These films often have such poor electromechanical coupling that they are useless for generating microwave phonons. Useful piezoelectric films must be insulating, not semiconducting, and must be crystallographically highly oriented.

Attempts have been made to change semiconducting films of cadmium sulfide to insulating films by counter doping with copper or silver. These attempts, while effective in increasing the film resistivity, adversely affect its piezoelectric properties and cause the C axes of the films to rotate approximately 15° to 20° away from the film surface normal. This rotation of the C axes results in the undesirable simultaneous generation of both shear and compressional waves.

Attempts have also been made to fill sulfur vacancies, which are the cause of the semiconducting properties, by heating the cadmium sulfide film in sulfur vapor at a high temperature. This technique, while also increasing the resistivity somewhat, does not appear to improve the piezoelectric efficiency by any significant amount.

It is considered that all of the prior efforts to form high frequency piezoelectric transducer films are therefore inadequate because they fail to achieve, reproducibly, a truly insulating crystalline layer with its C axis normal to the film surface as is desirable for an efficient transducer. The problems in evaporating satisfactory films from a source of the compound may be due to the large difference in the vapor pressures of cadmium and sulfur at any one temperature.

SUMMARY OF THE INVENTION

It is, therefore, an object of the present invention to provide an improved method of producing thin films of materials suitable for generating acoustic waves at high frequencies.

Another object is to provide an improved method of forming a thin film of an insulating material which may be precisely doped for controlled semiconductivity.

Another object is to provide an improved method of forming a thin insulating film that requires only a single evaporation step and can be of carefully controlled thickness and does not require treatment after its initial formation.

Another object is to provide an improved method for forming multi-layer piezoelectric transducers.

Another object is to provide an improved method for forming thin insulating films of carefully controlled thickness, reproducibly, on a variety of substrate surfaces without requiring the use of bonding materials.

Another object is to provide an improved method of forming high frequency piezoelectric films that are not affected by shock or magnetic films.

Another object is to provide a method of forming films that are capable of generating either shear waves or compressional wave independently.

The invention, briefly, achieves the above-mentioned and additional objects and advantages by a new vapor deposition technique that utilizes anomalous properties of insulating compounds in that the individual elements thereof have, when evaporated alone, the capability of depositing only a substrate having a temperature in a limited range. There is typically a gap between suitable substrate deposition temperatures for each of the individual elements of a single compound. But it has been discovered that if the substrate is maintained at a temperature between the temperatures suitable for the single elements, both elements may be simultaneously deposited, from separate sources, forming the compound stoichiometrically.

For example, in the case of cadmium sulfide, it is found that sulfur deposits alone only at substrate temperatures less than 50° C. While cadmium will deposit only at substrate temperatures greater than 200° C. Therefore, at a substrate temperature between 50° and 200° C. neither cadmium nor sulfur will deposit from a vapor of only the individual element. However, if both elements are present successful deposition of cadmium sulfide occurs on the substrate surface.

This technique is also applicable to other insulating materials including, for example, III–V and II–VI compounds such as zinc sulfide, indium phosphide, indium arsenide and mercuric sulfide. Also, ternary compounds such as antimony sulfur iodide may be formed.

The invention also includes methods of forming metal oxide compounds. Such compounds include, for example, oxides of the elements zinc, aluminum, silicon, magnesium, beryllium, titanium and zirconium. Of these, some are particularly attractive for piezoelectric properties. For example, zinc oxide has the highest known electromechanical coupling coefficient.

Two principal factors determine the success of the method of this invention in making films of the compound stoichiometrically with a high reproducibility. They are that the sources of evaporated elements are not directly exposed to the substrate but rather vaporized material must travel around a baffle to reach the substrate. Also, the temperature of the substrate is controlled to be such that individual elements do not deposit thereon. Furthermore, it is found particularly to be the case that for greatest consistency in making stoichiometric films, with good orientation consistent with that of the substrate, that in the case of oxides the substrate temperature should be at least as low as −75° C.

The compounds given as examples are mentioned merely to demonstrate the versatility of the technique disclosed as applicable to a wide range of types of insulating compounds.

DRAWING

The invention, together with the above-mentioned and additional objects and advantages thereof will be better understood by referring to the following description taken with the accompanying drawing wherein.

DESCRIPTION OF DEPOSITION OF COMPOUNDS OF NORMALLY SOLID ELEMENTS

Figure 1:
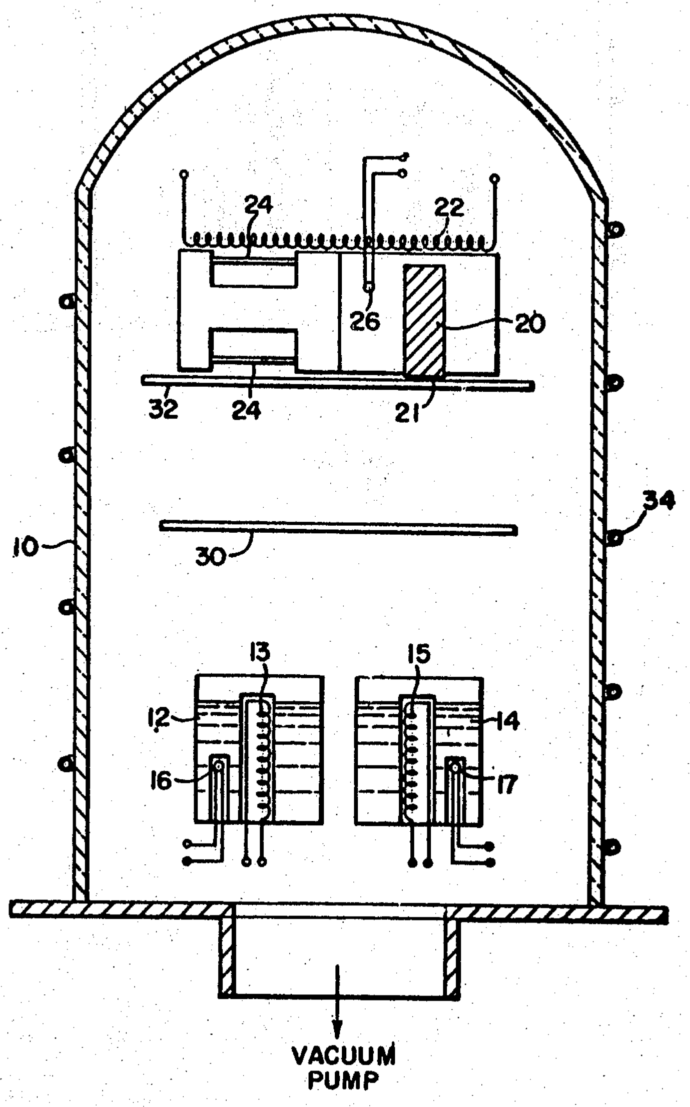
FIG. 1 is a schematic illustration of vapor deposition apparatus used in the practice of the present invention.

FIG. 1 shows the apparatus employed in forming a thin insulating film by the present invention. The apparatus will be particularly described in connection with the formation of films of cadmium sulfide although it will be apparent that other insulating films may be produced by the same method and substantially similar apparatus. Within an enclosure 10, in this instance provided by a bell jar, there are positioned two sources of material to be evaporated, a source of cadmium 12 and a source of sulfur 14. Each of the sources 12 and 14 is a crucible having resistance heating elements 13 and 15, respectively, extending from the bottom thereof. The sources 12 and 14 also have inserted therein thermocouples 16 and 17, respectively, for monitoring the temperature of each source.

Elsewhere within the bell jar there is positioned a substrate 20 having one end 21 exposed so that the vapor of the evaporated elements has access thereto. Films may, if desired, be simultaneously deposited on a plurality of substrates. The substrate 20 is heated by a heater 22 that also heats and maintains at the same temperature a pair of quartz crystal oscillators 24 used to monitor film thickness. A thermocouple element 26 is positioned to monitor the temperature of the substrate and quartz crystal oscillators.

A baffle 30 of a plate of a material such as stainless steel is positioned between the sources 12 and 14 and the substrate 20 to insure the deposition results from the vapor alone and not from direct molecular beams or splashed material. The baffle 30 also prevents infrared radiation from the heated crucibles from reaching the substrate and changing its temperature.

A movable shutter 32 is placed directly below the substrate 20 and the quartz crystals 24. When closed, the shutter 32 completely isolates the substrate and quartz monitor crystal from the vapor. This permits adjustment of vapor emission rates from the crucibles to the desired value before deposition is permitted. The shutter also allows the deposition to be abruptly terminated at the desired thickness.

Naturally, suitable means for holding the sources 12 and 14, substrate 20, quartz crystals 24, baffle 30 and shutter 32 are provided but are not illustrated.

A fourth heater element 34 encircles the bell jar and is used to prevent sulfur from immediately depositing on the cold walls. This permits the required sulfur vapor pressure to be maintained and also good visibility into the chamber for visual monitoring.

The four heaters are each controlled separately. The source heaters 13 and 15 are manually controlled to provide the desired vapor emission rates. The heater 34 on the bell jar wall is controlled to a temperature of about 150° C. Cadmium sulfide will be deposited on the bell jar surface and serves as a good visual monitor of the deposition process. The heater 22 for the substrate is maintained at a temperature between 50° and 200° C. because of the fact that within that range stoichiometric cadmium sulfide is produced on the substrate although that is a temperature range in which neither of the individual elements cadmium and sulfur will deposit alone.

The tungsten heater elements 13 and 15 in the sources are shielded from the substrate 20 to prevent contamination of the deposited film. Fused quartz crucibles have been used having a diameter of approximately 2.5 centimeters and a depth of about 5 centimeters.

The insulating films adhere only to a substrate surface that is completely clean. Contamination of the surface also adversely affects the crystalline perfection of the resulting film. A variety of substrates have been satisfactorily employed including aluminum oxide ($Al_2O_3$), magnesium oxide (MgO), titanium dioxide ($TiO_2$), fused quartz, crystalline quartz (Z-cut, X-cut, Ac-cut and Y-cut), glass, ruby, germanium, silicon, lithium fluoride (LiF), calcium fluoride ($CaF_2$), yttrium aluminum garnet, and gold films supported on $Al_2O_3$. In all instances it is found that the C axes of the resulting films are perpendicular to the film surface. However, the crystallinity of the film varies depending on the orientation of the substrate. Films deposited on glassy substrates are polycrystalline, with the orientation of the A axes of the crystallites distributed over angles varying from 15° to 45°. Films deposited on single crystal substrates (e.g., $Al_2O_3$) have their A axes much more highly oriented. For epitaxial growth on $Al_2O_3$ it is found preferable for the substrate surface to be perpendicular to the $Al_2O_3$ A axis.

The following cleaning procedure was generally found adequate and is disclosed by way of example. On any of the mentioned substrates the surface is cleaned by chemical means and then by ion bombardment. It is believed that an ion bombardment step may be essential. Chemical treatment involves first washing in concentrated nitric acid and then in concentrated sodium hydroxide. After being rinsed in distilled water the sample is boiled in ethyl alcohol for about ten minutes and then held in ethyl alcohol vapor for a few minutes before being blown dry by a jet of dry nitrogen. If the samples are not to be immediately used, they are stored in a vacuum desiccator until the ion bombardment and vapor deposition procedures are to be carried out.

For the ion bombardment cleaning, the sample is placed in a brass or stainless steel holder so that only the one surface to be cleaned is exposed. The sample is then subjected to ion bombardment for at least about 30 minutes using about 700 to 2,000 volts AC at 600 c.p.s. while the pressure in the bell jar is held at approximately 0.1 millimeter of mercury. A minimum current of about 50 milliamperes was found necessary.

After this procedure the bell jar 10 is evacuated to a pressure between $10^{-5}$ and $10^{-6}$ millimeters of mercury before the various heaters are turned on in preparation for vapor deposition. Particular care must be taken in using substrates of hydroscopic materials such as magnesium oxide and the alkaline halides to prevent an amorphous film from forming on the deposition surfaces. These materials should be kept in a vacuum desiccator at all times between surface polishing, surface cleaning and deposition.

The quartz crystal sensing element 24 and the circuitry employed therewith are known and will only be briefly described. Other means for determining the thickness of the evaporated film may be employed. Two quartz controlled oscillators are used. The crystal of one is exposed to the vapor while that of the other is not and serves as a reference. The outputs of the oscillators are mixed and the difference frequency amplified before being applied to the input of an electronic counter. The difference frequency can be recorded on either a digital printer or a pen recorder or on both if desired. As the cadmium sulfide deposits on the monitor quartz the frequency of resonance changes in direct proportion to the thickness of the films. Of course it is not necessary that the reference quartz oscillator be within the bell jar. It is considered desirable to maintain it at the same temperature as the other oscillator. Film thickness may be precisely determined using an infrared transmission spectrophotometer.

In carrying out the present invention the samples are chemically cleaned, as by the technique mentioned before, before being inserted into the sample holder. The bell jar is evacuated to a pressure suitable for ion bombardment and the sample as well as the microbalance monitor quartz disk is cleaned by ion bombardment. The bell jar is next evacuated to a pressure lower than $10^{-5}$ millimeters of mercury before the bell jar and substrate heaters are turned on. After the temperature of the substrate has reached the desired value the cadmium and sulfur are brought up to their respective boiling points, the heater currents being adjusted so that bubbling just occurs. At this stage the vacuum pumping speed is adjusted to maintain the vapor pressure at the desired value between $10^{-4}$ and $10^{-3}$ millimeters of mercury. This pressure determines the deposition rate which can be adjusted to a suitable value for the film thickness to be deposited. The microbalance and associated circuitry, having been kept operating on standby, are next turned on. When cadmium sulfide deposition on the bell jar 10 is well established the shutter 32 is opened to allow deposition on the monitor quartz 24 and the substrate 20. From the microbalance calibration curves the required value of the difference frequency is determined for the desired film thickness and the shutter 32 is closed when the electronic counter indicates that this value has been reached. The bell jar and crucible heaters 34, 13 and 15 are then turned off and maximum pumping speed resumed. When the ultimate bell jar pressure is reached, the substrate heater is turned off to allow slow cooling of the substrate and film to room temperature.

The deposition rate is an important parameter affecting the crystal structure of the deposited film. It is found that slower deposition rates result in more highly oriented films. Deposition rates between 5 and 100 angstroms per second have been used.

Highly oriented cadmium sulfide films epitaxially formed on single crystal substrates with oriented A and C axes were placed in the electric field of a coaxial cavity and found to generate stress waves which propagate into the substrate material. The orientation of the electric field relative to the film determines the mode of the generated stress waves. When the electric field is normal to the film surface compressional waves alone are generated. When the electric field is in the plane of the film and directed along the A axis, shear waves alone are generated.

The cadmium sulfide films formed are very pale yellow in color and are of extremely high purity, as indicated by both electrical and electron diffraction studies. Distortion of the lattice due to interstitial or substitutional impurity atoms could not be traced in the electron diffraction measurements. Dark resistivities greater than $10^{12}$ ohm centimeters were measured at room temperature. Active films of cadmium sulfide were as thick as about 8 microns, with a fundamental resonant frequency near 250 megacycles. Films as thin as 300 angstroms were deposited, with fundamental resonant frequency near 75 megacycles. No effect due to shock or magnetic fields results with transducers of this type.

Using the vapor deposition technique described, zinc sulfide piezoelectric transducers have also been deposited on aluminum oxide, magnesium oxide and titanium dioxide with success.

It will be recognized that the crystalline insulating materials formed by the method of this invention assume various crystal structures. While a thin insulating film with high crystallinity of cadmium sulfide can be formed by the described technique maintaining the temperature of the substrate between 50° and 200° C. it is found that in the range from 50° to 150° C. the cubic phase of cadmium sulfide is obtained which, while useful for purposes such as photoconductivity, only weakly exhibits piezoelectricity and can only generate shear waves. Between about 150° and 180° C. films having both cubic and hexagonal phases were present. With the substrate at a temperature from 180° C. to 200° hexagonal cadmium sulfide was deposited having a high degree of piezoelectricity activity.

In the case of zinc sulfide it was found possible to deposit films with a substrate temperature maintained at from 50° to 225° C. with the cubic phase resulting in a range from 50° to 100° C. and the hexagonal phase resulting in a range from 180° to 225° C. Both phases are piezoelectric, the hexagonal phase having a higher electromechanical coupling coefficient. The films of zinc sulfide were colorless and their presence on the substrate can only be verified by observing colored interference fringes in white reflected light.

Results to the present indicated a wide variety of films of insulating compounds can be formed by the method described using separate sources of the individual elements wherein the substrate is maintained at a temperature in the range at which the individual elements do not deposit. II–VI compounds and III–V compounds may be so formed, particularly compounds of the following elements:

| Group II | Group VI |
|---|---|
| Mg | S |
| Zn | Se |
| Cd | Te |
| Hg | |

| Group III | Group V |
|---|---|
| Al | P |
| Ga | As |
| In | Sb |
| Tl | Bi |

Additionally, other binary compounds such as lead sulfide and ternary compounds and antimony sulfur iodide may be so formed. In forming films of a material such as antimony sulfur iodide, evaporation of the three elements from separate sources is carried out and the substrate is maintained at a temperature above that at which the deposition of either sulfur and iodine alone occurs and below that at which deposition of antimony alone occurs.

From present information, films of all of the foregoing materials can be formed on substrates maintained between 150° and 200° C. All temperatures expressed herein are approximate.

It is significant that in the practice of the present invention it is not necessary that the source materials be of high purity for production of films which are of extremely high purity. Satisfactory results have been obtained using sources of only about 99.9 percent purity.

Films formed in accordance with this invention may be used with advantage in the fabrication of low noise microwave delay lines applicable to phased array radar antennas.

The excellent optical properties of the films formed in accordance with the present invention make them quite suitable for infrared detectors or other photoconductive devices. Films of cadmium sulfide are completely transparent to radiation of wavelengths in excess of 15 microns. In general films made by this invention may be used for devices requiring high impedance photoconductors.

A variation on the specific technique disclosed is to produce a semiconducting film of known and controllable properties by including within the evaporation apparatus a third or possibly a third and fourth crucible for evaporating any desired doping impurities to introduce into the film as formed thus achieving more uniform and controllable doping. Also, by utilizing the photoconductive and semiconductive properties of such films, phototransistors may be fabricated with high sensitivity in the far infrared region.

Besides single film piezoelectric transducers, the method of the present invention is quite suitable for forming multi-layer thin film piezoelectric transducers as described in copending application Ser. No. 505,715 filed Oct. 29, 1965 by R. G. Klemens and assigned to the assignee of the present invention, which application is now abandoned and succeeded by continuation application Ser. No. 871,534, filed Nov. 10, 1969, now issued as U.S. Pat. No. 3,543,058, Nov. 24, 1970. That application should be referred to for further details on such transducers.

The procedure to form a multi-layer transducer is to form a first layer of a piezoelectric material having an effective thickness of half the acoustic wavelength which the structure is intended to generate. By effective thickness it is meant that the thickness may be one half of a single wavelength or an odd integral multiple thereof although a single half wavelength is preferred. Secondly, a layer is formed of a non-piezoelectric material also half a wavelength thick and an additional layer of a piezoelectric material also half a wavelength thick is formed. The wavelength is determined by the frequency at which the transducer is to be used and the velocity of sound in the materials of the various layers. One structure for example may be that in which the piezoelectric layers are of cadmium sulfide while the intermediate layer is of silicon dioxide or aluminum oxide. The intermediate layers may be produced by any of the various known techniques. As many active and passive layers as desired may be formed, each extra layer increasing the efficiency. However the increased efficiency is not a linear function of the number of layers and thus from a practical standpoint only a few layers can usefully be used.

The multi-layer structure may also be formed so that the layers are alternately hexagonal piezoelectric cadmium sulfide and cubic non-piezoelectric cadmium sulfide since the latter material is only weakly piezoelectric and only in the shear mode. Such a structure may be fabricated in a single chamber using the sources described above by merely varying the temperature of the substrate so that it is between 180° and 200° C. for forming hexagonal cadmium sulfide layers and is between 50° and 150° C. for forming the intermediate layers of cubic cadmium sulfide. Of course, it is also the case that other insulating or piezoelectric materials may be used in the multi-layer transducer structure. The structures have usefulness in forming high efficiency piezoelectric transducers valuable for use in solid state microwave delay lines where maximum attainable conversion efficiency is desired.

DESCRIPTION OF DEPOSITION OF METAL OXIDES

The electromechanical coupling coefficient, $k$, of piezoelectric thin film transducers is extremely important. This coefficient is defined as:

$$k^2 = \frac{4\pi c d^2}{\epsilon}$$

where $c$ = elastic constant
$d$ = piezoelectric constant
$\epsilon$ = dielectric constant The application of the transducer dictates the range of $k$ values most suitable for a particular purpose. For microwave acoustic attenuation measurements low $k$ values are desirable, whereas high $k$ valves are required for microwave acoustic delay lines. The material with the highest known value of $k$ for compressional waves is zinc oxide. The methodology of this invention was applied to the formation of thin highly crystalline films of zinc oxide with crystallographic orientation most suitable for compressional microwave generation and detection. In so doing, it was found that substrate temperature should be controlled to a low level of at least −75° C. It was also found that conditions similar to those suitable for forming highly oriented zinc oxide films can be applied to the formation of other metal oxide films.

Figure 2:
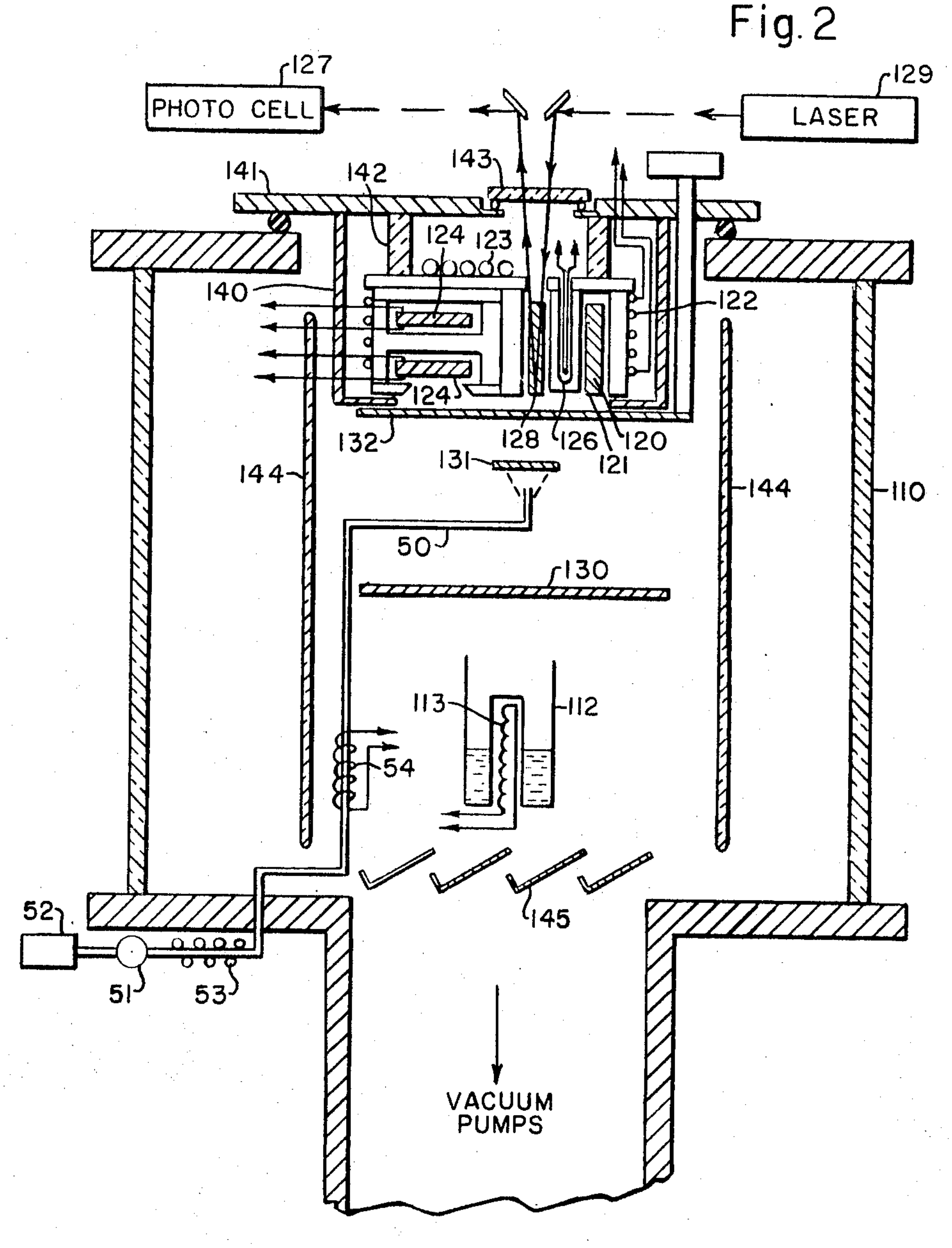
FIG. 2 is a schematic illustration of alternative apparatus particularly for vapor deposition of oxide films.

FIG. 2 illustrates apparatus employed for the deposition of various oxide films. It includes an enclosure 110 having an outer wall for isolation of the evaporation apparatus from room atmosphere. Provision for evacuation of the enclosure by vacuum pumps is provided. Within the enclosure 110 is positioned a source 112 of zinc or other material to be evaporated. The source is a crucible (e.g., of fused quartz tubing) having a resistance heating element 113 therein. Zinc was generated by sublimation at a low temperature. Zinc sublimates over a wide range of temperature below its melting point of about 900° C. From known data for zinc vapor pressure and sublimation temperature, the pressures employed herein indicate a sublimation temperature below 300° C. Direct measurement and control of the temperature of the metal source is difficult and unnecessary. Visual monitoring of zinc deposition and re-evaporation from the crucible walls proved to be a reliable guide to Zn vapor conditions. Additionally an oxygen gas inlet tube 50 is provided having one end within the enclosure and its other end exteriorly connected to the controlled leak valve 51 and oxygen supply 52. For controlled oxygen temperature (used in experimentation) the exterior portion of the tube has a liquid nitrogen cooling coil 53 about it while the interior portion of the tube has a resistance heater 54 about it.

In the upper portion of the enclosure 110 the is positioned a substrate 120 having one surface 121 exposed. For experimental purposes the apparatus was equipped with both a resistance heater 122 for the substrate and also a liquid nitrogen cooling coil 123 both in thermal proximity on portions of the substrate support apparatus. Additionally, as in FIG. 1, there are a pair of quartz crystal oscillators 124 used to monitor the film thickness of which one is shielded and one exposed in the same manner as the substrate 120.

The apparatus is also equipped with a thermocouple element positioned to monitor the substrate temperature and a laser monitor rod 128 positioned to receive and reflect radiation from a laser 129 to a photocell 127 indicative of deposition. While the apparatus may be varied considerably, it has been found useful to employ a metallic shield 140 such as one of stainless steel, laterally spaced from the substrate and monitoring equipment that shields the substrate in cooperation with shutter 132 and assists in insuring uniformity of temperature in the substrate space. Also, the physical mounting of the substrate and monitoring apparatus to the plate 141 of the enclosure is by means of an insulator body 142 such as one of porcelain to minimize thermal conduction. The plate 141, may be of brass and is sealed to the main body of the enclosure such as by O-rings. The plate 141 has therein a sealed window 143 of radiation transmissive material such as Pyrex glass for the laser monitoring equipment.

An inner cylinder 144 is positioned within the enclosure to minimize the space in which vapors travel which assists in maintaining a satisfactory rate of deposition. This inner cylinder may be of a material such as Pyrex glass. An inner cylinder 144 of 7 inches diameter was used within an outer enclosure 110 of 18 inches diameter.

At the lower end of the enclosure is schematically illustrated a liquid nitrogen chevron cold trap 145 found to be important in removing water vapor from the enclosure prior to lowering the substrate temperature for film deposition.

As in FIG. 1 a baffle or a plate of material 130 such as stainless steel is positioned between the source 112 and the substrate 120 to insure the deposition results from the vapor alone are not from direct molecular beams or splashed material and to prevent infrared radiation from the heated crucible from reaching the substrate and changing its temperature. Additionally, although they could be provided by the same baffle means, a hood or baffle 131 is provided over the aperture of the oxygen inlet tube also to prevent molecular beams of oxygen from impinging on the substrate. These baffle means insure that in the vicinity of the substrate there is only diffused vapor of the constituents of the compound to be formed with maintenance of steady relative proportions of those constituents with no direct line path between source and inlet to the substrate.

Also, as in FIG. 1, a movable shutter 132 is placed directly below the substrate 120 and the monitoring equipment. The shutter 132 is maintained closed until the correct vapor conditions are attained, opened for deposition to the desired thickness and closed again to terminate deposition.

Additional mechanical elements for supporting the various operative structures are of course provided.

In the deposition of highly oriented metal oxide films it is not found necessary to heat the walls of the enclosure.

As was found to be the case with the compounds that included two or more normally solid elements, the rate of deposition markedly influences the crystallographic orienting of the film and lower deposition rates result in films with superior crystallinity and piezoelectric properties than higher deposition rates. For these purposes the use of baffles 130 and 131 over the zinc source and oxygen inlet are important so that there is no direct path for deposition of material from the sources to the substrate. The baffles provide vapor pressure control in the upper portion of the chamber and hence the oxide film deposition rate. The baffle may take various forms including a solid plate across the entire space leaving room at the periphery for the passage of vapor or it may be a perforated baffle of the same diameter as the inner Pyrex cylinder with the number of open diffusion apertures determining the rate of deposition but with the perforations so located as to avoid any direct path between sources and substrata surface.

The substrate surfaces (e.g., of single crystal materials as mentioned in connection with CS deposition) were first carefully cleaned in the following manner. Any previous ZnO film deposit was completely removed with concentrated nitric acid before the substrate was immersed in hot NaOH solution for a few minutes and then washed in running distilled water. The sample was next immersed in $HNO_3$ (concentrated), then again washed in running distilled water. The substrate surface was then immersed in boiling alcohol, and subsequently held in the alcohol vapor before being blown dry with dry nitrogen gas. Then samples were transferred to a dust-free container to await installation in the sample holder. When installed, the sample housing was introduced into the vapor deposition apparatus. By means of a mechanical roughing pump the bell jar pressure was reduced to approximately $10^{-1}$ Torr to permit ion bombardment cleaning at 1,700 volts and 65 mA for 5 minutes with the sample housing shutter open and pumping speed adjusted to maintain $10^{-1}$ Torr pressure.

At the termination of this final step in the cleaning procedure, the sample housing shutter was closed and normal pumping speed resumed. With the aid of an oil diffusion pump and the liquid nitrogen cooled trap 145, the ambient pressure in the Pyrex cylinder 144 was then reduced to between $10^{-7}$ and $10^{-8}$ Torr preparatory to starting the deposition run.

In the experimental program that gave rise to the invention, the ZnO vapor deposition investigations basically involved four variable parameters, viz. (i) substrate temperature, (ii) zinc vapor pressure, (iii) oxygen pressure, and (iv) oxygen temperature. In order to determine how each variable would influence the physical properties of the ZnO films, a series of runs were made keeping three of these parameters constant while varying the fourth. The same weighed quantity of zinc shot (20 g.) was placed in the crucible 112 for each run, while the Zn vapor pressure was controlled by adjusting the crucible heater power dissipation. The oxygen pressure was controlled by a Granville-Phillips variable leak valve 51 in line with the oxygen supply 52, while the gas temperature was influenced by the heating or cooling coils 53 and 54 shown in FIG. 2.

Each run was started with the ambient pressure less than $10^{-7}$ Torr, and the chevron cold trap 145 over the pumping line cooled to liquid nitrogen temperature. This cold trap was maintained at liquid nitrogen temperature throughout the run and the flow of liquid nitrogen not interrupted before the sample temperature was restored to room temperature. After deciding what the substrate temperature would be during the run, the temperature controller was set for this value and the sample allowed to attain and remain at the desired temperature for approximately 2 hours to ensure thermal equilibrium in the entire sample holder. To set the substrate temperature both the liquid nitrogen coil 123 and the resistance heater 122 were used with the thermocouple 126 being the sensing element for the temperature controller. The presence of marked thermal gradients over the substrate surface resulted in inhomogeneous films, and care was taken to avoid such gradients. At this point oxygen was admitted and the flow adjusted to establish the desired pressure. After stabilization of the oxygen pressure, the zinc heater was turned on. The commencement of zinc vapor generation by sublimation was detected by a drop in the oxygen pressure due to ZnO deposition on the surfaces of the inner Pyrex cylinder 144. The oxygen flow rate was suitably adjusted to restore the original pressure. When the Zn vapor and oxygen pressure reached equilibrium, the sample chamber shutter was opened to allow ZnO deposition on the substrates. Film growth was observed throughout the run by means of the quartz crystal microbalance and the laser optical monitor system. When the desired film thickness had been deposited, the shutter 132 was closed before the Zn heater 113 and oxygen supply were turned off. The sample temperature was maintained until the original ambient pressure of less than $10^{-7}$ Torr was once more attained, at which stage the sample temperature controller, together with heating and cooling sources, was switched off. The substrate holder was allowed to return to room temperature solely by the thermal contact with the thick upper aluminum plate shown in FIG. 2. A complete run lasted from 6 to 8 hours depending upon the substrate temperature, film thickness and rate of deposition.

One of the problems encountered at the beginning of the investigation was cracking or peeling of the ZnO films from the substrate during or after the deposition. This appeared to be due to large differences in thermal expansion between the films and the $Al_2O_3$ substrates and was much more likely to occur with rapidly deposited films than with those deposited at a much lower rate. Deposition rate, however, was ultimately ruled out as the direct cause of the cracking or peeling. Stoichiometry was found to be an all-important parameter which determined the thermal expansion coefficient of the films, and consequently their cracking or peeling behavior. The thermal expansion of ZnO films which were close to stoichiometric closely matched the $Al_2O_3$ substrate coefficient, as they showed no signs of peeling or cracking. Films which were deficient in oxygen exhibited a much lower coefficient of thermal expansion than of the $Al_2O_3$ substrate; consequently, when the substrate and film temperature was increased from the deposition to room temperature, the films cracked. These films were hard, clear, grey-tinted, and fairly efficient phonon generators. Films which had an excess of oxygen by contrast, exhibited, a much higher coefficient of thermal expansion than the $Al_2O_3$ substrate. This excess of oxygen caused the films to expand a great deal more than the substrate on warming up to room temperature. As a result the films, which were soft and cloudy-amber in appearance, had become wrinkled and no longer adhered to the $Al_2O_3$ substrate surface. Phonon generation was not possible with such films.

On one occasion, as films which were deposited with a dark-grey color began to peel off the substrates during a run due to an oxygen deficiency, the oxygen pressure was increased from $10^{-5}$ Torr to $5 \times 10^{-5}$ Torr. Subsequent examination of the substrates, after the dark peeling ZnO films had been removed, revealed the new clear ZnO films had deposited on the substrates under the curled-up parts of the dark film. Such films were capable of quite efficient phonon generation.

The rate at which ZnO films could be deposited onto the single crystal substrates was determined by three independent parameters, viz., substrate temperature, zinc vapor pressure and oxygen pressure. Numerous deposition runs were made to determine the effect of varying one parameter while keeping the other two at fixed values. The effect of substrate temperature on deposition rate for a fixed set of values of zinc vapor and oxygen pressures was measured. The sample shutter was opened after the substrate holder had reached and remained at −50° C. for 2 hours. As no deposition was recorded after the substrates had been exposed for approximately 10 minutes, the substrate was gradually cooled to lower temperatures while the shutter remained open. Evidence of deposition, using both the quartz crystal microbalance and the laser beam optical monitor, was not observed until the substrate holder temperature had fallen slightly below −100° C. Beyond this point the deposition rate increased steadily until −150° C. was reached, at which time the temperature controller was set to maintain the sample temperature at this value. Subsequent runs showed very little change in deposition rate from −150° to −195° C. which was the lowest temperature attained in the ZnO vapor deposition system.

In order to determine what effect oxygen pressure would have on the ZnO deposition rate, the substrate temperature was held at −150° C, i.e., the temperature for maximum deposition rate, the zinc crucible heater current was adjusted and maintained to provide an adequate fixed zinc vapor pressure. At low oxygen pressures, near $10^{-5}$ Torr, the deposition rate was determined by the zinc vapor pressure, consequently the films were non-stoichiometric, i.e., deficient in oxygen. As the oxygen pressure was increased, the films became more nearly stoichiometric, while the deposition rate reduced, reaching a very low value, less than 50 A./min., as the pressure approached $10^{-3}$ Torr. At this high pressure the films once more became non-stoichiometric, but were deficient in zinc.

Changing the oxygen pressure effectively simultaneously reduced the available zinc vapor in the upper diffusion chamber shown in FIG. 2. This was due to the diffusion rate of zinc vapor from lower to upper chamber being reduced by the increased reaction of oxygen with zinc in the lower chamber. At pressures above $10^{-3}$ Torr, deposition ceased as the zinc vapor pressure in the upper chamber fell to zero. The zinc diffusion rate to the upper chamber was also dependent upon the baffle size, which determined the diffusion path cross-sectional area. In these studies the temperature of the zinc crucible was maintained well below melting point to insure sublimation. Without the baffle and the oxygen hood very high deposition rates were possible. As an example, a 3$\mu$ film could be deposited in approximately 2 minutes. Films deposited at such high rates could be deposited in approximately 2 minutes. Films deposited at such high rates showed very poor crystallographic ordering and hence correspondingly low electromechanical coupling factors. With the oxygen hood and a large area baffle in place, deposition rates could be made low enough to increase the deposition time required for a 3$\mu$ film to approximately four hours. Films deposited under the latter conditions showed a very high degree of ordering.

The investigation performed to determine the effects of varying the zinc vapor pressure while maintaining a constant oxygen flow rate and substrate temperature produced results very similar to those obtained by varying the oxygen pressure, described above.

The parameter which most strongly influenced the crystallographic ordering, as revealed by reflection electron diffraction (RED), was substrate temperature. For a given set of oxygen and zinc vapor pressures, films deposited onto $Al_2O_3$ single crystals at chosen fixed substrate temperatures between −50° and −195° C., were examined by means of reflection electron diffraction. For the ambient vapor and gas pressure of $10^{-4}$ Torr best ordering occurred at −150° C. At this temperature single crystal films were deposited. A 1,000 A. aluminum ground electrode on an $Al_2O_3$ single crystal substrate is a suitable substrate. The aluminum film itself was highly oriented.

Figure 3:
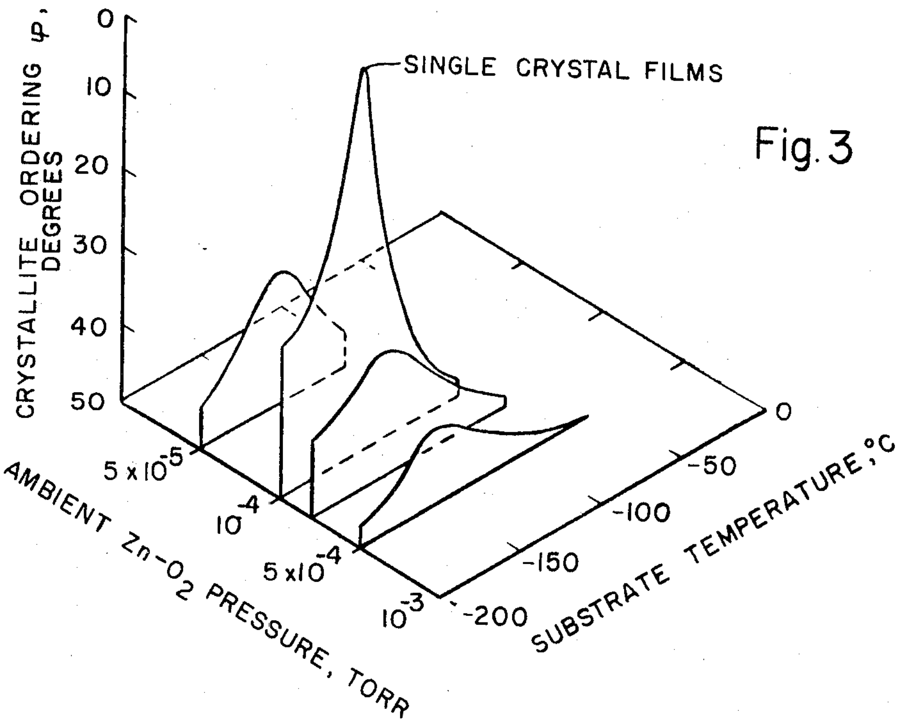
FIGS. 3 and 4 are sets of curves that show the effect of various parameters in the practice of the invention.

FIG. 3 shows in three-dimensional form the effect of substrate temperature on crystallite ordering as a function of $Zn–O_2$ pressure as was experimentally determined. The angle $\phi$ was always found to be smallest near −150° C. The very sharp peak on the $10^{-4}$ Torr curve indicates the conditions under which single crystal ZnO films were deposited from the vapor.

The last of the deposition parameters to be varied was the temperature of the oxygen. As indicated in FIG. 2, the oxygen supply tube could be either cooled by liquid nitrogen or heated by means of a molybdenum heater. The effects produced by either cooling or heating were indistinguishable from those produced by changing the oxygen pressure or flow rate. These effects have already been described in the preceding description. However, another way of varying the oxygen pressure, while maintaining the zinc vapor pressure, was to introduce a mixture of helium and oxygen and controlling the pressure ratio of these two gases. The depositions obtained under such conditions showed that no improvement in crystalline ordering could be achieved by introducing various amounts of helium. As a result, no further use was made of either introducing an inert gas or changing the temperature of the oxygen, as the oxygen pressure could be much more precisely controlled by means of the controlled leak valve.

Figure 4:
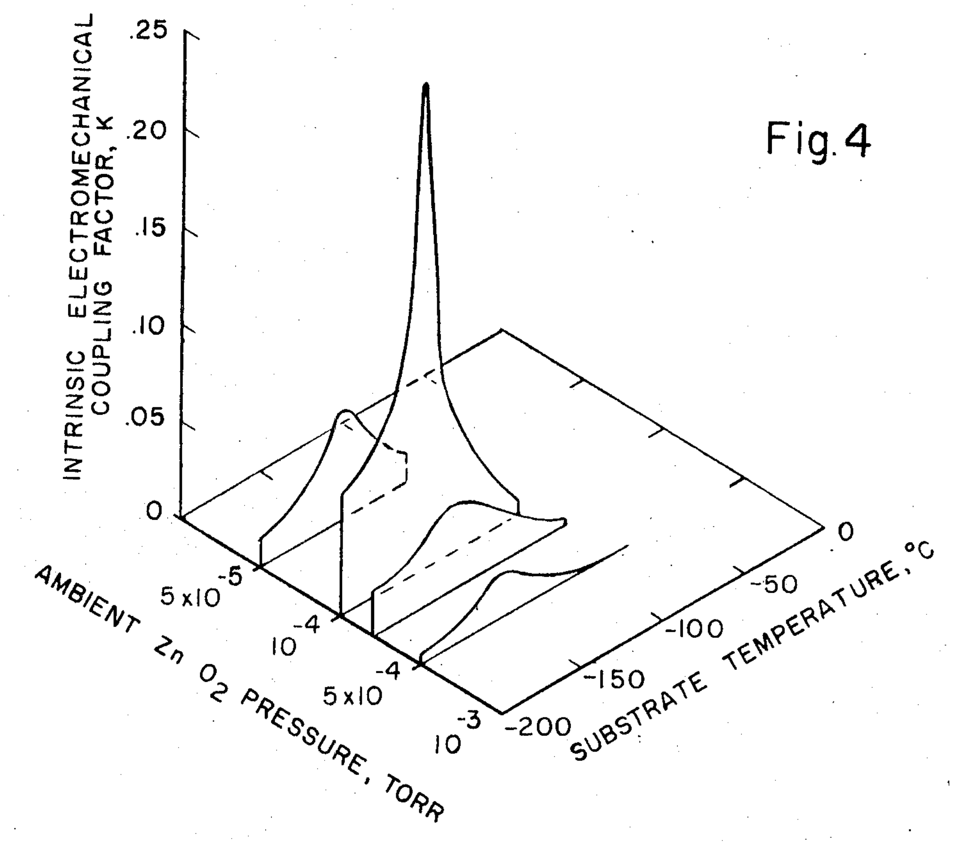

As the piezoelectric moduli of a crystalline material are determined by both the crystal structure and perfection of the material, one would expect that the piezoelectric properties of any vapor deposited film would be very strongly influenced by any deposition parameter which affected its crystalline perfection. The investigations described above proved this to be the case. Any parameter which affected either stoichiometry or crystal structure strongly influenced the piezoelectric properties of the deposited films. FIG. 4 is a three-dimensional representation of the effect substrate temperature has on the intrinsic electromechanical coupling factor $k$, as a function of $Zn–O_2$ pressure in the deposition chamber. The highest valve of $k = 0.25$, obtained with the single crystal films at −150° C. and $10^{-4}$ Torr, was approximately 10 percent below the value for bulk ZnO. This value is represented by the peak on the $10^{-4}$ Torr curve in FIG. 4. The discontinuity at the low temperature end of each curve occurred because the substrates were not cooled below this value, whereas the high temperature discontinuities were due to the cessation of deposition at higher temperatures.

To briefly summarize with respect to oxide film deposition by this invention, it has been found that metal oxide films are deposited (with a high degree of orientation on an oriented substrate) with essentially stoichiometric composition by evaporating the metal in an oxygen atmosphere while baffle means is positioned between the source and substrate and between the oxygen inlet and substrate and while the substrate is maintained at a temperature at least as low as about −75° C.

The baffle means is important to prevent direct molecular beams that adversely affect stoichiometry and ordering.

The substrate temperature is important because deposition at higher temperatures results in films having poor stoichiometry which means they have varying thermal expansion coefficients that results in adherence problems. Also, crystallographic ordering and piezoelectric properties are poor with films deposited at higher temperatures. While in the case of compounds of two or more normally solid elements there could be selected a substrate temperature intermediate those at which individual elements deposit with good results, the oxide deposition involves other factors. For example, oxygen will condense at temperatures below −183° C., and zinc will deposit at temperatures above about 225° C. Yet within this range deposition of films of the compound (within about 1 percent of stoichiometry) with good orientation (on an oriented substrate) occurs only within the much narrower range below −75° C. A preferred temperature occurs at and near −150° C. (within 25° C.).

It has been confirmed that similar behavior is exhibited by silicon dioxide. Results with a substrate temperature in the range of about −100° to −175° C. appear satisfactory. It is believed that other metal oxides will also behave similarly. Specifically, of interest for various piezoelectric, dielectric or optical properties are films of oxides of zinc, silicon, aluminum, magnesium, beryllium, titanium zirconium. Such films may be of the single binary compound or may include more than one metal in a mixed oxide. Lithium-gallium oxide is an example of a mixed oxide that may be so formed. The invention therefore extends to the formation of a film of at least one metal oxide.

The evaporation of the metal element or elements is not critical except that it has been found to greatly effect the rate of film deposition. Since crystal ordering generally deteriorates with faster deposition, it is preferred to keep it as slow as reasonable as by heating the metal source or sources only to a temperature sufficient to cause some film deposition. The temperature of the oxygen coming into the enclosure has not been found to be important.

The oxygen vapor pressure is of some importance because of its effect on deposition rate and stoichiometry. From results that have been obtained it is preferred that the pressure be maintained between about $5 \times 10^{-4}$ and about $5 \times 10^{-5}$ Torr, realizing that this pressure includes both metal and oxygen partial pressures. In a preferred procedure found effective, when the clean substrate is positioned in the enclosure, the later is pumped down to between $10^{-7}$ and $10^{-8}$ Torr with the source and oxygen supply off. The substrate is then cooled to the desired temperature, with sufficient time, such as two hours, to ensure uniformity on the substrate surface. Oxygen is admitted to bring the pressure to the desired level (in the range $5 \times 10^{-4}$ to $5 \times 10^{-5}$ Torr). Then the metal source is turned on causing a drop in pressure, because of oxide deposition. The pressure is then restored to the original range with more oxygen and deposition proceeds.

While the present invention has been shown and described in a few forms only, it will be apparent that various changes and modifications may be made without departing from the spirit and scope thereof.

I claim as my invention:

1. A method of forming on a substrate having an oriented surface a film of an oxide of at least one element selected from the group consisting of zinc, silicon, aluminum, magnesium, beryllium, titanium, zirconium, lithuim, and gallium, said method comprising: evaporating said at least one element from a source in an atmosphere consisting essentially of oxygen while (1) maintaining a baffle means between said source and said substrate to insure only vaporized material reaches said substrate throughout the formation of said film, (2) maintaining said substrate at a temperature within the range of from about −75° to about −195° C., and (3) maintaining the combined pressure of oxygen and said at least one element at less than $10^{-3}$ Torr.

2. The subject matter of claim 1 wherein: said element is zinc.

3. The subject matter of claim 1 wherein: said element is silicon and said substrate temperature is in the range of from about −100° to about −175° C.

4. The subject matter of claim 1 wherein: said substrate is a body of crystalline material and has, a clean surface on which said film is deposited with a crystalline orientation.

5. The subject matter of claim 1 wherein: said atmosphere including oxygen and evaporated material of said at least one element is at a pressure in the range of from about $5 \times 10^{-4}$ to about $5 \times 10^{-5}$ Torr.

6. The subject matter of claim 6: said pressure is, prior to deposition, pumped down to at least $10^{-7}$ Torr, oxygen is supplied to raise the pressure to said range; said at least one element is vaporized; additional oxygen is supplied to restore any pressure drop resulting from metal vaporization, and film deposition is then begun.

* * * * *